E. L. GAGE.
TRUCK SCALE.
APPLICATION FILED DEC. 14, 1910.
1,006,191.
Patented Oct. 17, 1911.
2 SHEETS—SHEET 2.
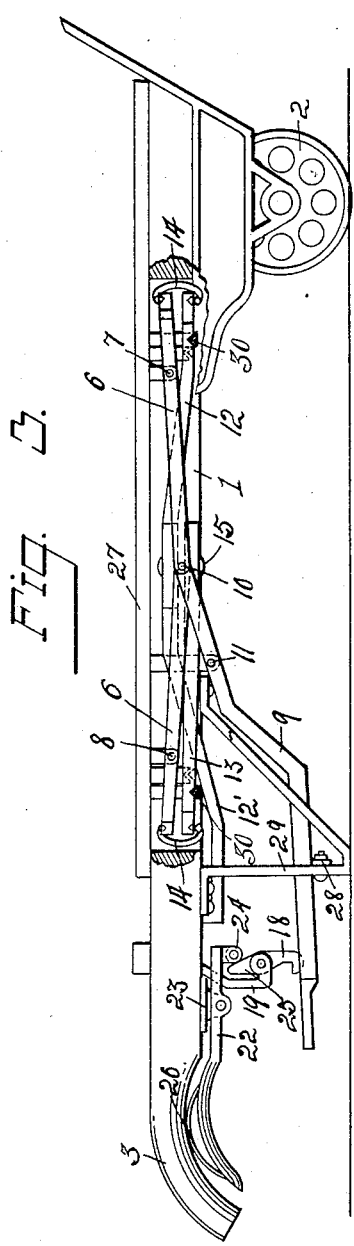
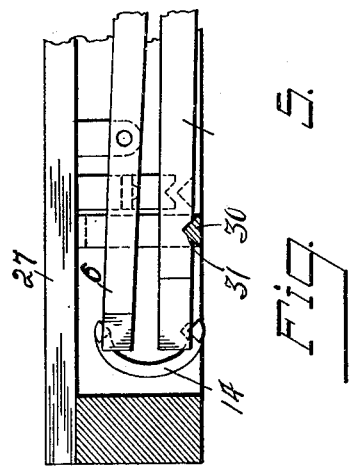
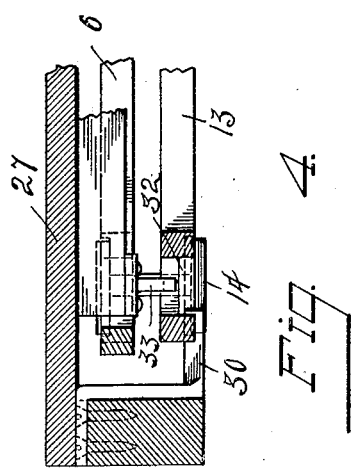
WITNESSES:
C. H. Bills.
E. E. Thomas.
INVENTOR.
Edwin L. Gage,
By Owen & Owen,
His attys.
COLUMBIA PLANOGRAPH CO., WASHINGTON, D. C.

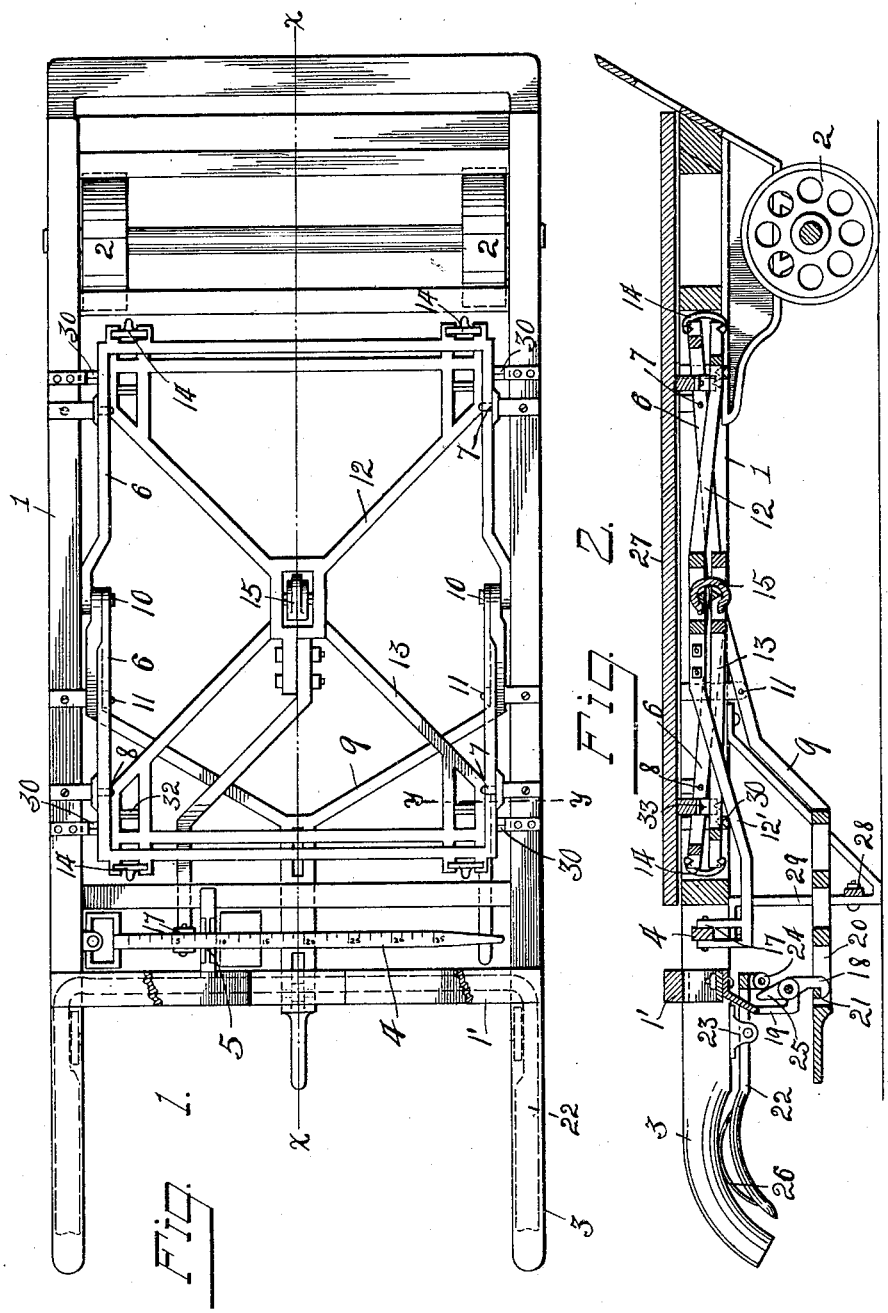

UNITED STATES PATENT OFFICE.

EDWIN L. GAGE, OF TOLEDO, OHIO.

TRUCK-SCALE.

1,006,191.  Specification of Letters Patent.  Patented Oct. 17, 1911.

Application filed December 14, 1910. Serial No. 597,356.

*To all whom it may concern:*

Be it known that I, EDWIN L. GAGE, a citizen of the United States, and a resident of Toledo, in the county of Lucas and State of Ohio, have invented a new and useful Truck-Scale; and I do hereby declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to that class of scales which are combined with a movable base or truck, and has particular reference to improvements on the truck-scales covered by United States Letters Patent Nos. 836,074, 898,457 and 955,640 granted to me on Nov. 13th, 1906, Sept. 15th, 1908 and April 19th, 1910, respectively.

The object of my invention is the provision, in combination with a truck of the hand or two wheel type and the associated scale apparatus of simple and efficient means for positively acting on the scale parts, to effect an automatic release thereof from operative weighing position when the operator grasps the truck handles to raise the same to move the truck from one place to another, whereby the injury which might be occasioned to the delicate weighing parts should the truck be moved before throwing the scale to inoperative position, is entirely obviated.

A further object of my invention is the provision of simple and efficient means for supporting the scale-levers, when in inoperative position, in a manner to prevent longitudinal and lateral movements thereof relative to the frame and preferably free from contact with the scale-lever pivots, thus preventing the racking swinging movements of the scale-levers when the truck is in motion, which movements are so injurious to the delicate weighing parts of apparatus of this nature.

The invention is fully described in the following specification, and a preferred embodiment of the same illustrated in the accompanying drawings, in which,—

Figure 1 is a plan of a truck and scale embodying the features of my invention, with the bed or platform removed. Fig. 2 is a vertical longitudinal section of the same on the line $x$ $x$ in Fig. 1. Fig. 3 is a side elevation of the truck with a portion of the frame broken away and the weighing parts in inoperative position. Fig. 4 is an enlarged section on the line $y$ $y$ in Fig. 1, and Fig. 5 is an enlarged view of an end portion of the frame and a portion of the scale-levers and associated parts in inoperative position.

Referring to the drawings, 1 designates the frame of a truck of the two wheeled or hand type. This frame is supported at its forward end by the wheels 2 in the usual or any suitable manner, and has its rear ends of its side pieces extended to form the lifting handles 3. At the rear end of the frame, or in any other suitable position therein, is disposed the scale beam 4, which is provided with the usual weights and is fulcrumed in a suitable manner to the frame 1 or to a bracket secured thereto, as at 5.

6, 6 designates U-shaped elevating levers, the forward one of which has its legs pivoted to the frame sides, as at 7, while the rear lever has its legs pivoted to the frame sides, as at 8. These levers have their legs directed toward each other and pivotally connected at their inner ends in a suitable manner to the ends of the associated arms of the forked operating-lever 9, as shown at 10. The operating-lever has its arms fulcrumed to the frame sides, as at 11, and has its handle portion projecting rearwardly under the scale beam, and preferably extended beyond the rear cross-piece 1' of the frame 1, as shown, to adapt it to be readily grasped by the operator when it is desired to move the same to manipulate the elevating-levers 6, 6.

12 and 13 designate the usual scale-levers in an apparatus of this class, which levers may be of any suitable form and construction and are pivotally suspended at their outer ends from the outer or looped ends of the elevating-levers 6, 6 by loops 14, as shown, and have their inner ends pivotally connected, as by a loop 15 engaging suitable pivots thereon, as indicated. The main scale-lever 12 is provided at its inner end with an arm 12', which projects rearwardly and suitably connects at its free end in proper position to the scale beam 4, as at 17.

The operating-lever 9 when raised is held in operative or weighing position by a dog 18 which is pivoted to the bracket 19 projecting, in the present instance, downwardly from the rear cross-piece 1' of the frame.

The dog 18 has its nose projecting through a slot 20 in the handle portion of the operating-lever to adapt its hooked end to engage under a cross-piece 21 of such handle, as shown, whereby to support the handle in elevated position.

22 designates a U-shaped releasing-lever which has its loop portion disposed beneath or adjacent the cross-piece 1' of the frame and its arms extending rearwardly under the handles 3 in substantial parallelism therewith and pivoted to brackets 23 beneath such handles as shown. The inner or looped portion of the lever 22 is provided with a roller or projection 24 in position to coact with and engage the tail-piece 25 of the dog 18 in such manner as to oscillate and effect a release of the dog from engagement with the part 21 on the lever-handle 9. Upon a release of the lever-handle in this manner the lever drops by gravity and moves the scale parts to inoperative position. A spring 26 is disposed between either or both of the handles 3 and the arms of the lever 22 to act on said lever to normally retain its inner end in elevated position. It is thus apparent that upon a grasping and raising of the handles 3 of the truck frame the lever 22 will be first moved against the tension of the spring 26 to effect a lowering of the roller or projection 24 and a consequent release of the dog 18 from engagement with the operating-lever 9.

27 designates the scale bed or platform, which, when elevated in operative position, rests upon the scale levers in the usual or any suitable manner. Upon a throwing of the scale parts to inoperative position the platform is lowered and rests upon the truck frame instead of upon the scale parts, thus relieving such parts from the weight of the bed when not in operative weighing position.

It is apparent from the above description and the drawings that to place the scale parts in operative weighing position it is necessary to raise the operating-lever 9 from its lowered position, in which position it rests upon the cross bar 28 connecting the rear standards 29 of the truck frame, into position to engage with and be supported by the hooked end of the dog 18. When the weighing has been performed and the operator grasps the handles 3 of the truck to move the load, the arms of the release-lever 22 are oscillated against the tension of the spring 26 and the inner end of such lever lowered to cause the projection 24 to coact with and move the dog 18 to release the operating lever 9 to permit it to drop by gravity to inoperative position, thus throwing the scale parts to inoperative position.

30 designates fingers which are carried by the frame sides and project inwardly therefrom under the outer end portions of the scale-levers 12 and 13 in position to support such levers when lowered to inoperative position, as indicated in Figs. 3, 4 and 5. The fingers 30 are preferably of inverted V-shape in cross-section and fit into correspondingly shaped notches 31 in the associated ends of the scale-levers to prevent longitudinal movements of the levers relative to the frame 1 as well as to support such levers. The fingers 30 are so disposed and the lowering movements of the outer ends of the levers 6 so proportioned that after the platform 27 has lowered upon the frame 1 the outer ends of the scale-levers 12 and 13 lower slightly to release their pivots 32 from engagement with the platform feet 33 before striking the fingers 30 and the loops 14 then lower from supporting engagement with the levers 12 and 13, as indicated in Fig. 5, thus holding the levers rigid and relieving their pivotal points of wear when the scale is not in operation or the truck is in motion.

I wish it understood that my invention is not limited to any specific construction or arrangement of the parts except in so far as such limitations are specified in the claims.

Having thus described my invention, what I claim as new and desire to secure by Letters Patent, is,—

1. In a truck-scale, the combination with the scale parts, and the operating-lever movable to throw the scale parts into operative or inoperative position, of a member adapted to coöperate with said lever to hold the same elevated to maintain the scale parts in operative position, and means automatically operative by a grasping of the truck handle to effect a release of such member from the lever.

2. In a truck-scale, a frame having a raising handle at one end thereof, scale parts carried by such frame, a member adapted to coact with one of such parts to maintain the scale parts in operative position, and means associated with such handle and operative, by a grasping of the handle, to release said member from engagement with such parts to permit a movement of the scale parts to inoperative position.

3. In a truck-scale, the combination with a truck frame and the scale parts, of a member adapted to coöperate with one of such parts to maintain the scale parts in operative position, and a lever carried by the frame and movable, by a grasping of a part of the frame, to release such member from engagement with the scale part to permit a movement of such parts to inoperative position.

4. In a truck-scale, the combination with a two-wheel truck frame having handles at one end thereof, and the scale parts, of a member adapted to engage and hold one of such parts elevated to maintain the scale parts in operative position, a U-shaped lever having its arms extending under said truck-frame arms and pivoted to the truck-frame intermediate their ends, said lever when oscillated being adapted to have its looped portion engage and effect a release of said member from the engaged scale part, and means yieldingly holding said lever in one position of its movement.

5. In a truck-scale, the combination with a two-wheel truck frame having handles at an end thereof, and the scale parts, of a member adapted to engage and hold one of such parts elevated to maintain the scale parts in operative position, and a lever associated with one of such handles and operative to effect a movement of said member to release the engaged scale part when the frame handle is grasped.

6. In a truck-scale, the combination with a truck frame and the scale-levers carried thereby and movable to operative and inoperative positions, of fingers fixedly projecting from the frame adjacent the outer ends of the scale-levers and beneath associated portions of such levers, said fingers being substantially V-shaped in cross-section and adapted to form supports for the levers when in inoperative position to prevent swinging movements thereof relative to the frame, and said levers having notches in which such fingers seat.

In testimony whereof, I have hereunto signed my name to this specification in the presence of two subscribing witnesses.

EDWIN L. GAGE.

Witnesses:
C. W. OWEN,
E. E. THOMAS.

---

Copies of this patent may be obtained for five cents each, by addressing the "Commissioner of Patents, Washington, D. C."